United States Patent
Lissajoux et al.

(10) Patent No.: US 9,824,594 B2
(45) Date of Patent: Nov. 21, 2017

(54) METHOD FOR PREDICTING A SHORT TERM FLIGHT PATH OF AN AIRCRAFT, COMPUTER PROGRAM PRODUCT, ASSOCIATED PREDICTION DEVICE, GUIDANCE METHOD, GUIDANCE SYSTEM AND AIRCRAFT

(71) Applicant: THALES, Courbevoie (FR)

(72) Inventors: Sylvain Lissajoux, Toulouse (FR); Alexandre Badatcheff, Toulouse (FR); Matthieu Claybrough, Toulouse (FR)

(73) Assignee: THALES, Courbevoie (FR)

( * ) Notice: Subject to any disclaimer, the term of this patent is extended or adjusted under 35 U.S.C. 154(b) by 42 days.

(21) Appl. No.: 14/739,303

(22) Filed: Jun. 15, 2015

(65) Prior Publication Data

US 2015/0364046 A1    Dec. 17, 2015

(30) Foreign Application Priority Data

Jun. 16, 2014   (FR) ...................... 14 01357

(51) Int. Cl.
    *G08G 5/00*   (2006.01)
    *G01C 23/00*  (2006.01)
    *G05D 1/10*   (2006.01)

(52) U.S. Cl.
    CPC ........... *G08G 5/0047* (2013.01); *G01C 23/00* (2013.01); *G05D 1/101* (2013.01)

(58) Field of Classification Search
    CPC ....... G08G 5/0047; G05D 1/101; G01C 23/00
    See application file for complete search history.

(56) References Cited

U.S. PATENT DOCUMENTS

| | | | | |
|---|---|---|---|---|
| 5,722,620 | A * | 3/1998 | Najmabadi | B64C 13/16 244/181 |
| 5,920,321 | A | 7/1999 | Owen et al. | |
| 6,522,958 | B1 * | 2/2003 | Dwyer | G01C 23/00 340/995.1 |
| 6,922,631 | B1 * | 7/2005 | Dwyer | G01C 23/00 340/971 |
| 8,086,362 | B2 | 12/2011 | Dupre et al. | |

(Continued)

OTHER PUBLICATIONS

Search Report dated Apr. 23, 2015 for French Patent Application No. 1401357 filed Jun. 16, 2014.

*Primary Examiner* — Jerrah Edwards
*Assistant Examiner* — Majdi Alsomiri
(74) *Attorney, Agent, or Firm* — Knobbe, Martens, Olson & Bear, LLP

(57) ABSTRACT

A method for predicting a short-term flight path of an aircraft, a computer program product, an associated prediction device, a guidance method, and a guidance system of an aircraft are disclosed. In one aspect, the flight path of the aircraft is associated at each time moment with a vector including at least one component from among a position of the aircraft, attitudes of the aircraft and order 1 and 2 time derivatives of the position and attitudes. The short-term flight path is the flight path of the aircraft for a time period of up to 30 seconds from a computation time of the flight path. The method includes acquiring a control signal representative of a displacement of a primary control member of the aircraft and predicting, at a subsequent prediction time, at least one component of the short-term flight path of the aircraft.

17 Claims, 4 Drawing Sheets

(56) References Cited

U.S. PATENT DOCUMENTS

| | | | |
|---|---|---|---|
| 8,498,769 B2* | 7/2013 | Sacle | G01C 21/00 |
| | | | 701/11 |
| 8,886,369 B2* | 11/2014 | Sharkany | G01C 23/00 |
| | | | 701/14 |
| 2001/0039467 A1* | 11/2001 | Katz | G01C 19/30 |
| | | | 701/4 |
| 2008/0161982 A1 | 7/2008 | Coulmeau et al. | |
| 2009/0055037 A1* | 2/2009 | Dupre | G05D 1/0202 |
| | | | 701/14 |
| 2011/0196549 A1 | 8/2011 | Sharkany et al. | |

\* cited by examiner

METHOD FOR PREDICTING A SHORT TERM FLIGHT PATH OF AN AIRCRAFT, COMPUTER PROGRAM PRODUCT, ASSOCIATED PREDICTION DEVICE, GUIDANCE METHOD, GUIDANCE SYSTEM AND AIRCRAFT

CROSS-REFERENCE TO RELATED APPLICATIONS

This application claims benefit under 35 U.S.C. §119 of French Application No. 14 01357, filed Jun. 16, 2014, which is herein incorporated by reference in its entirety.

BACKGROUND

Technological Field

The described technology relates to a method for predicting a short-term flight path of an aircraft, the flight path of the aircraft being associated at each time moment with a vector including at least one component from among a position of the aircraft, attitudes of the aircraft and order 1 and 2 time derivatives of the position and attitudes, the short-term flight path being the flight path of the aircraft for a time period of up to 30 seconds from a computation date of the flight path, the method including: an acquisition step for acquiring a control signal representative of a displacement of a primary control member of the aircraft; a prediction step for predicting, on a subsequent prediction date, at least one component of the short-term flight path of the aircraft, the prediction step being carried out on the computation date.

Description of the Related Technology

"Flight path of the aircraft" generally refers to a vector including at least one component from among the position of the aircraft, attitudes of the aircraft and order 1 and 2 time derivatives of the position and attitudes. These order 1 and 2 derivatives then correspond to the traveling speeds, angular speeds, accelerations and angular accelerations.

"Short-term flight path prediction" generally refers to the prediction, on a computation date T, of all or part of the components of the vector associated with the flight path of the aircraft on a prediction date T' after the computation date T, the prediction date T' being comprised in a time period of up to 30 seconds from the computation date T of the flight path.

Traditionally, the pilot of an aircraft controls the device primarily by using one or more primary control members, generally a yoke or a side-stick and/or one or more throttles. Via the actuation of the or each primary control member, the pilot commands an attitude change of the aircraft or causes an increase in the thrust of one or more reactors of the apparatus, which results in modifying the flight path of the aircraft.

Generally, the pilot uses his own sensations, for example the acceleration that he feels when actuating the primary control members or the evolution of his visual references, as well as his flight experience, to anticipate the future flight path and correct that flight path until the aircraft is brought to the desired flight path.

However, the pilot generally does not have any explicit indication regarding the short-term consequence of an action on the primary control members on the flight path of the aircraft.

U.S. Pat. No. 8,086,362 B2 describes a method for predicting the flight path of an aircraft from instructions from a pilot of the aircraft, and displaying the predicted flight path.

During the implementation of this method, the value of the instructions for computing the flight path is considered to be constant and equal to the value of the instruction on a given computation date.

When the maneuver is not done with a constant instruction, for example constant roll, the predicted flight path sometimes differs significantly from the actual future flight path.

SUMMARY OF CERTAIN INVENTIVE ASPECTS

One objective of certain inventive aspects is therefore to improve the prediction of the flight path of the aircraft, in particular the prediction of the short-term flight path.

To that end, certain aspects relate to a method of the aforementioned type, wherein the prediction step further includes computing, from the control signal, an estimate, between the computation date and a subsequent prediction date, of at least one time derivative of at least one predicted component, the or each estimated time derivative depending on the subsequent prediction date and on the displacement of each primary control member.

In fact, the computation, from the control signal, of an estimate of the variations over time of a time derivative of the or each predicted component can provide a more reliable prediction of the short-term flight path of the aircraft.

Another aspect also relates to a non-transitory computer-readable medium comprising a computer program including software instructions which, when implemented by a computer, carry out such a method.

Another aspect also relates to a prediction device carrying out such a method.

Another aspect also relates to an aircraft guidance method.

Another aspect also relates to a guidance system implementing such a guidance method.

Another aspect also relates to an aircraft including such a device.

Other aspects apply to the field of aircraft guidance assistance, in particular short-term flight path prediction.

According to other aspects, the method includes one or more of the following characteristics, considered alone or according to any technically possible combinations: the prediction step includes computing at least one short-term flight path component of the aircraft from the computed estimate of the or each corresponding time derivative; the prediction step further includes computing an estimate of the variation, between the computation date and the prediction date, of at least one component among the roll angle, the longitudinal speed and the vertical speed of the aircraft, and/or at least one additional property relative to the aircraft; the additional property is a turning radius, an airspeed, or a gradient of the aircraft; the prediction step comprises converting a first signal depending on the control signal into a second signal representative of an estimate of the value of the first signal on at least one date after the computation date, from the value of the first signal on at least one date prior or equal to the computation date; the conversion of the signal depending on the control signal is the application to the signal of a filter having a transfer function, the phase of which is greater than or equal to zero in a predetermined frequency band; the transfer function of the filter varies as a function of time; the transfer function of the filter varies based on the type of aircraft and/or time-dependent properties measured by at least one sensor of the aircraft; the prediction step includes modifying the estimate of the variation of at least one component of the short-term flight path of the aircraft and/or at least one additional property, based on at least one estimate of the variation of another component of the short-term flight path of the aircraft and/or another additional property; at least one additional property is as a turning radius, an airspeed, or a gradient of the aircraft.

Another aspect also relates to a non-transitory computer-readable medium comprising a computer program including software instructions which, when implemented by a computer, carry out the method as defined above.

Another aspect also relates to a prediction device for predicting a short-term flight path of an aircraft, the flight path of the aircraft being associated at each time moment with a vector including at least one component from among a position of the aircraft, attitudes of the aircraft and order 1 and 2 time derivatives of the position and attitudes, the short-term flight path being the flight path of the aircraft for a time period of up to 30 seconds from a computation date of the flight path, the prediction device including: an acquiring capability for acquiring a control signal representative of a command applied by the user to a control member of the aircraft; at least one module for predicting, on the computation date, at least one component of the short-term flight path of the aircraft; wherein the or each prediction module is further suitable for computing, from the control signal, an estimate, between the computation date and a subsequent prediction date, of at least one time derivative of the or each predicted component, the or each estimated time derivative depending on the subsequent prediction date.

Another aspect also relates to an aircraft guidance method including the following steps: predicting a short-term flight path using the method as defined above; enslaving at least one component of the flight path of the aircraft relative to the corresponding component of the predicted flight path.

According to other aspects, the guidance method includes one or more of the following characteristics, considered alone or according to any technically possible combinations: the or each predicted component of the flight path is no longer modified during the enslavement step and then forms an instruction designed to be sent to an enslavement device for the flight path of the aircraft; the or each primary control member is associated with at least one component of the flight path, the or each primary control member has a neutral zone, the neutral zone representing a predefined displacement range of the primary control member around a predetermined position of the primary control member, and, when a primary control member is positioned in the neutral position in one or more directions, the component(s) of the flight path of the aircraft associated with the directions are enslaved relative to the corresponding predicted component of the short-term flight path.

Another aspect also relates to an aircraft guidance system, including: a prediction device as defined above, able to predict a short-term flight path of the aircraft; an enslavement device able to enslave the flight path of the aircraft relative to the predicted short-term flight path.

Yet another aspect also relates to an aircraft including at least one control member and a prediction device as defined above to predict the short-term flight path of the aircraft from a command applied by a user to the or each control member.

According to one aspect, the aircraft further includes an enslavement device to enslave the short-term flight path of the aircraft relative to the predicted short-term flight path.

BRIEF DESCRIPTION OF THE DRAWINGS

The described technology will be better understood using the following description, provided solely as a non-limiting example and done in reference to the appended drawings, in which.

DETAILED DESCRIPTION OF CERTAIN INVENTIVE EMBODIMENTS

Figure 1:
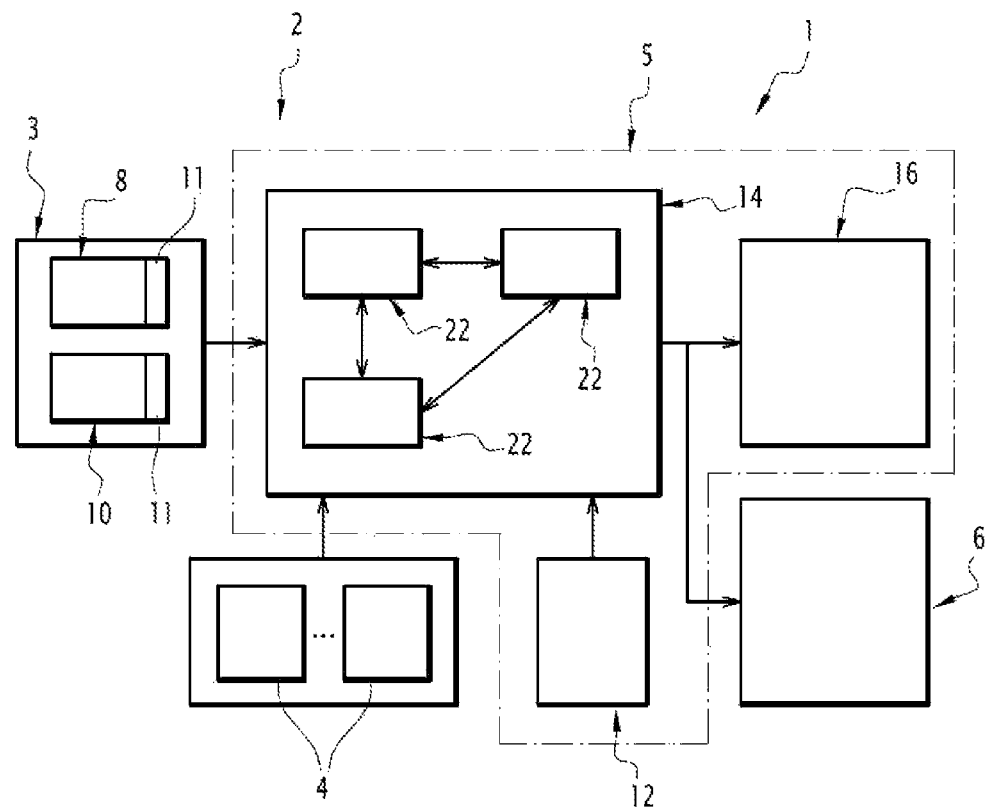
FIG. 1 is a diagrammatic illustration of an aircraft guidance system according to an embodiment, the guidance system including three modules for predicting the short-term flight path.
Figure 2:
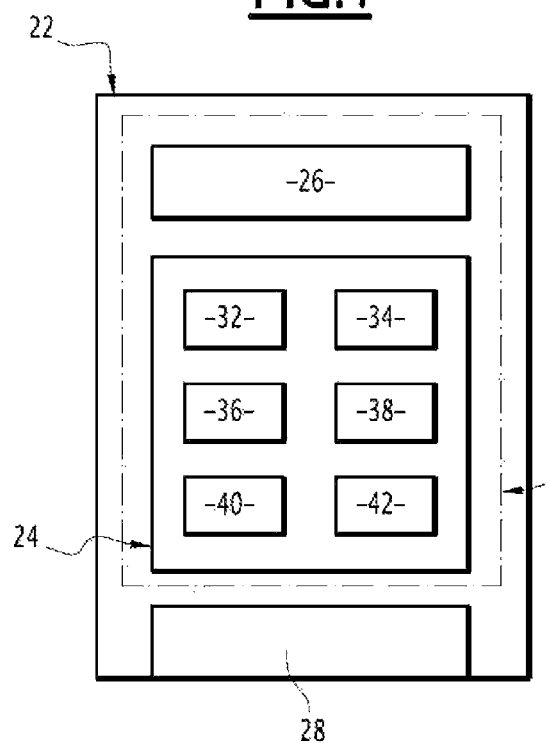
FIG. 2 is a diagrammatic illustration of one of the prediction modules of FIG. 1.

In FIG. 1, an aircraft 1 comprises a guidance system 2, primary control members 3 and a plurality of sensors 4.

The guidance system 2 shown in FIG. 1 is suitable for enslaving the flight path of an aircraft 1 relative to a predetermined short-term flight path.

"Enslaving" refers to the control, by the guidance system 2, of the flight path of the aircraft 1. In particular, "enslaving" refers to feedback control or closed-loop control of the flight path of the aircraft 1 by the guidance system 2.

Desirably, the guidance system 2 is onboard the aircraft 1.

The guidance system 2 includes a prediction device 5 for predicting the short-term flight path of the aircraft 1, also called predicted short-term flight path. The guidance system 2 also includes an enslavement device 6 for enslaving the flight path of the aircraft 1 on the short-term flight path predicted by the prediction device 5.

The primary control members 3 include one or more yokes or side-sticks 8 and one or more members 10 for controlling the thrust and optionally the drag of the aircraft 1. Subsequently, the term "yoke" will indifferently refer to a yoke or a side-stick.

Each primary control member 3 includes an acquisition device 11 able to convert a command applied by a user on the primary control member 3 into a control signal representative of the applied command. Such a command is for example a command to vary a component of the flight path of the aircraft 1. Such a system is commonly called "fly by wire" (FBW).

Alternatively, the primary control members 3 are suitable for converting an action exerted by the user on the primary control members 3 into a mechanical action on an actuator of the aircraft 1. Such an actuator is for example an aerodynamic control surface. Such a system is commonly called "mechanical flight control". The aircraft 1 then includes conversion systems (not shown) able to convert a command applied by a user on the primary control member 3 into a command signal representative of the applied command.

The yoke 8 is suitable for allowing a user to steer the attitudes of the aircraft 1, for example by commanding a roll rate and a load factor of the aircraft 1.

"Roll rate" refers to the angular speed associated with the roll angle, i.e., the time derivative of the roll angle, the roll angle being defined later.

"Load factor" refers to the ratio between the apparent weight of the aircraft 1 and the norm of its actual weight, projected on a vertical reference axis $z_1$ defined later.

Traditionally, the yoke is suitable for being actuated in transverse movements, longitudinal movements or any combination of transverse and longitudinal movements.

More specifically, the yoke 8 is suitable for allowing a user to control the roll rate through transverse movements of the yoke 8. Furthermore, the yoke 8 is suitable for allowing a user to control the load factor through longitudinal movements of the yoke 8.

Traditionally, the control member 10 is suitable for allowing the user to set a power for example via a thrust level, an engine rating, a fuel delivery, a propeller or rotor pitch. For example, the thrust control member 10 includes one or more throttles.

The sensors 4 are each able to provide at least one datum relative to the configuration of the aircraft 1 or the physical parameters of the air near the aircraft 1, for example the air temperature, pressure, or speed relative to the aircraft 1.

Advantageously, the sensors 4 comprise sensors able to provide information relative to the position of the aircraft 1, the attitudes of the aircraft 1, the order 1 and 2 time-related derivatives of the position and attitudes of the aircraft 1.

Figure 5:
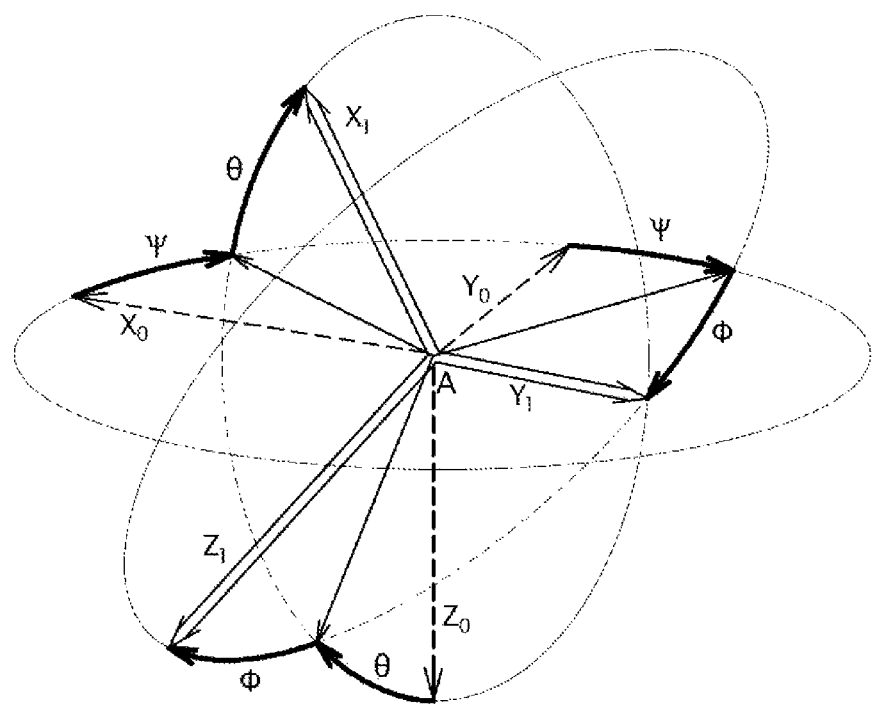
FIG. 5 is a diagrammatic illustration of projections of the vectors of a base connected to the aircraft in a reference base.

Within the meaning of this disclosure, "attitudes" generally refer to the oriented angles between the predetermined axes of the aircraft 1, called aircraft axes, and their projection in reference planes. The attitudes include the roll angle, the pitch angle and the heading, known in themselves and recalled below, in reference to FIG. 5.

The reference planes are determined from three reference axes.

The aircraft axes and the reference axes come together at a predetermined point A of the aircraft 1, for example close to the center of gravity of the aircraft 1.

The reference axes are the axes of the local land referential and include a vertical reference axis $z_0$, a longitudinal reference axis $x_0$ and a transverse reference axis $y_0$, forming a direct orthonormal base $(x_0, y_0, z_0)$ called "reference base".

The vertical reference axis $z_0$ is an axis oriented in the descending direction of the local gravitational field and passing through the predetermined point A of the aircraft 1. The longitudinal reference axis $x_0$ is an axis oriented in a predetermined direction, for example toward magnetic or geographical North, and orthogonal to the vertical reference axis $z_0$. The transverse reference axis $y_0$ completes $z_0$ and $x_0$ to form the "reference base".

The vertical $z_0$ and longitudinal $x_0$ reference axes form a vertical reference plane. The transverse $y_0$ and longitudinal $x_0$ reference axes form a horizontal reference plane.

The aircraft axes comprise a longitudinal aircraft axis $x_1$, a vertical aircraft axis $z_1$ and a transverse aircraft axis $y_1$, forming a direct orthonormal base $(x_1, y_1, z_1)$ called "aircraft base".

The longitudinal aircraft axis $x_1$ is an axis oriented toward the front of the aircraft 1, passing through the predetermined point A and belonging to a plane of symmetry of the aircraft 1. The plane of symmetry of the aircraft 1 is generally related to the geometric definition of the cell of the aircraft 1. The transverse aircraft axis $y_1$ is the axis perpendicular to the plane of symmetry and oriented toward the right of the aircraft 1, i.e., the right of an observer onboard the aircraft 1 and facing toward the front of the aircraft 1. The vertical aircraft axis $z_1$ completes $y_1$ and $x_1$ to form the "aircraft base".

The angle $\Phi$ between the transverse aircraft axis $y_1$ and the horizontal reference plane is the roll angle. The angle $\theta$ between the longitudinal aircraft axis $x_1$ and the horizontal reference plane is the pitch angle. The angle $\psi$ between the longitudinal aircraft axis $x_1$ and the vertical reference plane is the heading. $\Phi$, $\theta$ and $\psi$ are generally called the Euler angles and make it possible to go from the aircraft base to the reference base.

Advantageously, the sensors 4 also comprise sensors able to provide information relative to the position of mechanical elements of the aircraft 1, for example the position of a control surface, the configuration and the status of the motor(s).

Advantageously, the sensors 4 further comprise sensors able to take measurements of the airspeed of the aircraft 1, such as measurements of the true airspeed (TAS), calibrated airspeed or computed airspeed (CAS), the Mach speed or the altitudes. Such sensors are for example air data unit (ADU) systems.

The sensors 4 of the aircraft 1 are for example integrated into an Attitude and Heading Reference System (AHRS) or Inertial Reference System (IRS). Advantageously, these sensors are able to measure the speeds in the reference base and the geographical position of the aircraft 1.

Advantageously, the sensors 4 include GPS sensors and/or a radio altimeter.

The prediction device 5 includes a memory 12. The prediction device 5 also includes a computer 14 for computing the short-term flight path of the aircraft 1 from the action of a user on all or some of the primary control members 3, as well as from data stored in the memory 12 and/or coming from the or each sensor 4.

The prediction device 5 further includes a display 16 able to display, advantageously for the user, the short-term flight path predicted by the computer 14. Alternatively, the display is separate from the guidance system 2 or the prediction device 5.

The memory 12 is suitable for storing a plurality of data relative to the aircraft 1, for example data relative to the performance of the aircraft 1, or data relative to one or more configurations of the aircraft 1 that are allowed, also called "flight envelope". For example, the flight envelope comprises the minimum and maximum roll and pitch angles (defined below) authorized for the aircraft 1 at a given moment or point in time. The flight envelope for example depends on the flight phase of the aircraft 1, or the altitude of the aircraft 1.

The computer 14 is suitable for computing, on a computation date or computation time T, a prediction of the flight path of the aircraft 1 on a prediction date or prediction time T', after the computation date T.

The computer 14 includes a plurality of prediction modules 22. For example, the computer 14 includes three prediction modules 22.

Alternatively, the computer 14 includes a single prediction module 22.

The display 16 is for example a head-up display or a helmet-mounted display (HUD or HMD), or any screen in the cockpit (for example a Primary Flight Display (PFD)).

The prediction modules 22 are able to communicate with one another, for example via a shared bus.

Each prediction module 22 is able to compute, on the computation date T, from the control signal or a transform of the control signal as defined below, an estimate of the value, on the subsequent prediction date T', of all or some of the components of the flight path of the aircraft 1.

In particular, at least one prediction module 22 is able to compute, from the control signal or a transform of the control signal, an estimate of the value, on the subsequent prediction date T', of at least one time derivative.

Desirably, each prediction module 22 is able to compute, from the control signal, the variation, between the computation date T and the prediction date T', the roll angle, and/or the gradient and/or the airspeed module (TAS or CAS or Mach) and/or the ground speed module of the aircraft 1. "Ground speed" refers to the projection of the speed vector of the aircraft 1 in the plane $(x_0, y_0)$ formed by the axes $x_0$ and $y_0$.

"Gradient" refers to the angle between the horizontal reference plane and the ground speed vector of the aircraft 1.

In the example of FIG. 1, a first prediction module 22 is suitable for computing an estimate of the variation of the roll angle.

A second prediction module 22 is suitable for computing an estimate of the variation of the gradient.

A third prediction module 22 is suitable for computing an estimate of the variation of the longitudinal speed.

Optionally, each prediction module 22 is first able to compute a first estimate, called "preliminary estimate", of the variation over time of the corresponding component of the flight path of the aircraft 1.

Each prediction module 22 is then able to compute, from all or some of the preliminary estimates, a corrected estimate of the corresponding component of the flight path of the aircraft 1.

Advantageously, each prediction module 22 is able to convert the control signal into an instruction, then to compute an estimate of the variation of the corresponding component of the flight path of the aircraft 1 from the instruction.

Advantageously, each prediction module 22 is able to convert the control signal into a load factor and/or roll rate and/or longitudinal acceleration instruction, then to compute an estimate of the variation of the component of the flight path of the aircraft 1 from the instruction(s).

According to the alternative where the computer 14 includes a single prediction module 22, the prediction module 22 is suitable for computing, from the control signal, an estimate of the variation, between the computation date T and the prediction date T', of the longitudinal acceleration and the load factor and roll rate.

The single prediction module 22 is further suitable for computing, from the control signal, the variation, between the computation date T and the prediction date T', of the longitudinal speed, and/or the gradient and/or the roll angle, respectively from the predicted variation of the longitudinal acceleration and/or the load factor and/or the roll rate.

In the described example embodiment, each prediction module 22 includes a memory 24, a processor 26 and a transceiver 28, the memory 24 and the processor 26 forming an information processing unit 30.

The memory 24 is able to store data reading software 32, conversion software 34, processing software 36, estimate sending software 38, estimate receiving software 40, and correction software 42.

The processor 26 is able to load and execute each of the programs 32, 34, 36, 38, 40, 42.

The transceiver 28 is able to send estimates computed by the corresponding prediction module 22 to another prediction module 22 and/or to the display 16.

The transceiver 28 is further able to receive estimates computed by other prediction modules 22, and receive data from the memory 12 and the sensors 4.

The read program 32 is suitable for reading the data stored in the memory 12 and the data sent by the sensors 4, and for reading the control signal sent by each of the primary control members 3.

The conversion program 34 is able to convert each control signal into an instruction, such as a longitudinal acceleration instruction, or a load factor instruction, or a roll rate instruction, from data read by the read software 32 in the memory 12 and/or from the sensors 4.

The processing program 36 is able to compute, from the control signal converted by the conversion program 34, an estimate of the variation over time, from the computation date T to the prediction date T', of the property corresponding to the control signal.

The processing software 36 is also able to compute the transform of the control signal via a predetermined transform. The purpose of such a transform is to provide a signal representative of an estimate on at least one date T* after the computation date T, such as dates before and after the prediction date T', of the future evolution of the control signal from the value of the control signal on at least one date before or equal to the computation date T.

For example, a filter is applied to the control signal.

For example, in the case of continuous signals, the filter is a linear filter with predetermined transfer function H.

For example, in the case of discrete signals, each sample of the transform of the control signal depends on one or more samples of the control signal and one or more preceding samples of the transform of the control signal.

Advantageously, the transfer function H is the transfer function of a filter having a positive phase in a predetermined frequency band. Advantageously, the transfer function filter H has a positive phase in the frequency band comprised between 0 Hz and 20 Hz, desirably comprised between 0 Hz and 10 Hz, still more desirably comprised between 0 Hz and 5 Hz.

The transfer function H is for example the transfer function of a high-pass filter.

For example, in the case of continuous signals, in the Laplace domain, a simple expression of a high-pass filter H is written:

$$H(p) = \frac{G}{1 + Kp}$$

where the coefficients G, K are the coefficients of the transfer function H.

The value of all or some of the coefficients G, K of the transfer function H varies as a function of the data provided by the sensors 4. Different values authorized for the coefficients G, K are stored in the memory 12.

For example, to predict the roll rate or load factor, the transfer function H is written:

$$H(p) = \frac{1}{1 + p}$$

In the case of discrete signals, the relationship between the input and output samples of the filter is traditionally deduced from the preceding expressions of the transfer function H.

When it is executed, the processing software 36 is suitable for modifying the values of the coefficients G, K as a function of data provided by the sensors 4 and read by the read program 32.

The processing program 36 is further suitable for computing an integral relative to the time of a signal depending on the control signal, and adjusting the value of the computed integral to the current value of the corresponding property.

The sending program 38 is able to send an estimate from the corresponding prediction module 22 to another prediction module 22. Desirably, the software 38 is able to send a preliminary estimate to the other prediction modules 22.

The receiving program 40 of a given prediction module 22 can receive an estimate from another prediction module 22.

The correction program 42 is suitable for correcting the estimate computed by the processing program 36 of the corresponding prediction module 22, if an estimate is received from another prediction module 22. Such a correction in particular reflects the variations over time of the angles between the aircraft axes and the reference axes, and therefore the variation over time of the projection of the speed vectors of the aircraft in the reference base. Such a correction also reflects the variation over time of the speed modules of the aircraft 1. For example, such a correction accounts for the relationship between the vertical speed and the gradient, and the relationship between the vertical speed and the ground speed. Such a correction also for example reflects the relationship between the roll angle, the ground speed and a turning radius, the turning radius being a notion known by those skilled in the art.

The correction program 42 is also suitable for correcting the computed estimate in case of variation of the value measured by one or more predetermined sensors 4.

Figure 3:
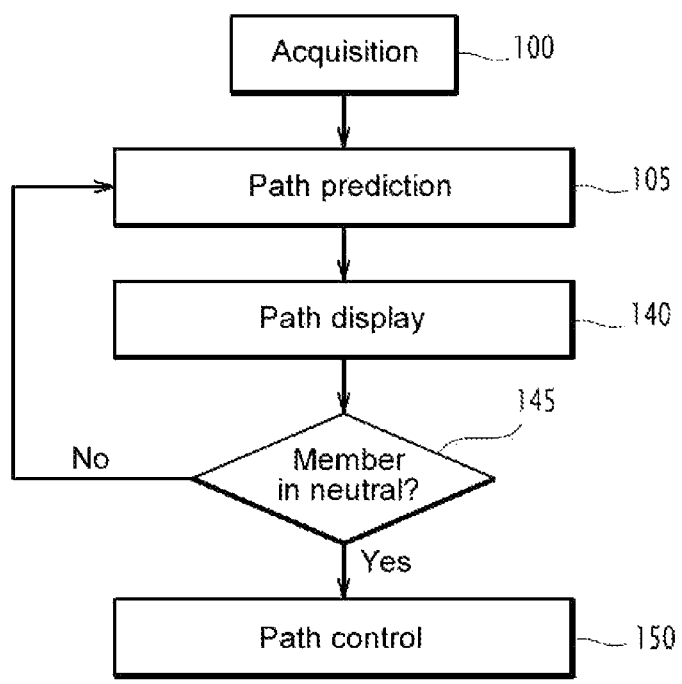
FIG. 3 is a flowchart of an aircraft guidance method, implemented by the system of FIG. 1.

The operation of the guidance system 2 will now be described in reference to FIGS. 3 and 4.

During the flight phase of the aircraft 1, the user actuates the yoke 8 or the thrust control member 10 during a first acquisition step 100.

The acquisition device 11 converts the manual command from the user into a command signal.

During a following prediction step 105, the computer 14 computes, on the computation date T and from the control signal, a prediction of the short-term flight path of the aircraft 1 on the subsequent prediction date T'. In particular, the computer 14 computes a prediction of the longitudinal speed, the gradient and the roll angle of the aircraft 1 on the prediction date T'.

Figure 4:
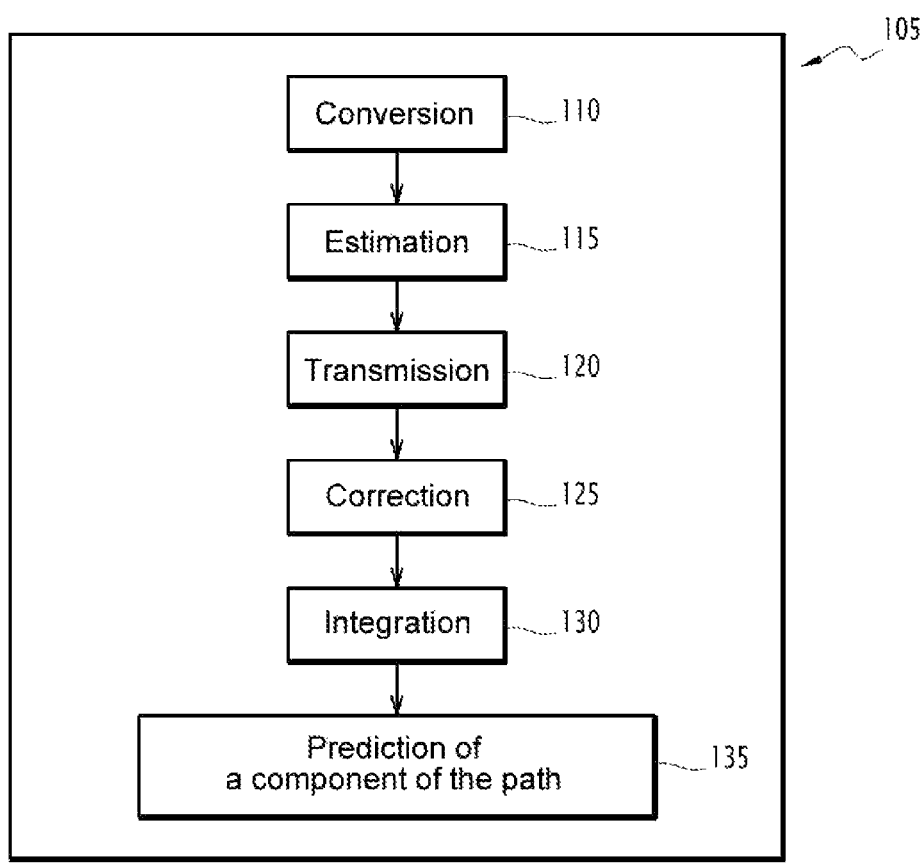
FIG. 4 is a detail of a step of the method of FIG. 3.

As shown in FIG. 4, prediction step 105 includes a plurality of sub-steps.

During a sub-step 110, the read program 32 of each prediction module 22 reads the control signal delivered by the primary control member 3 associated with the prediction module 22.

Furthermore, during sub-step 110, the read program 32 reads the data provided by the sensors 4. The read program 32 next reads, in the memory 12, the predetermined coefficients G, K that correspond to the data received from the sensors 4. Then, the processing program 34 converts the control signal into an instruction for the parameter associated with the control signal, i.e., for example, a longitudinal acceleration instruction, or a load factor or roll rate instruction.

During a following sub-step 115, the read software 32 reads, in the memory 12, the predetermined coefficients of the transfer function H, corresponding to the data received from the sensors 4 during step 110.

Next, the processing software 36 applies the predetermined filter to the instruction, the coefficients of the filter being the coefficients read in the memory 12 by the read software 32, to compute an estimate of the variation of the component of the flight path corresponding to the prediction module 22 among the longitudinal acceleration, the load factor and the roll rate.

During a following sub-step 120, the estimate sending program 38 sends the estimate computed during step 110 to the other prediction modules 22.

During a following sub-step 125, and if the estimate receiving software 40 has received an estimate from another prediction module 22, the processing program 36 corrects the estimate previously computed.

During a following integration sub-step 130, the processing program 36 computes the integral relative to the time of the estimate of the component of the flight path corresponding to the prediction module 22 in order to obtain a variation in longitudinal speed or gradient or roll angle.

For example, for the prediction module 22 able to compute the variation of the gradient, at the end of the sub-step 130, the processing program 36 will have computed the variation of the gradient of the aircraft 1 between the computation date T and the prediction date T'.

During a following sub-step 135, the processing program 36 computes the estimate of the corresponding component of the flight path of the aircraft 1 on the prediction date T' by adding the predicted variation of the component to the current value, on the computation date T, of the component. The current value of the component corresponding to the prediction module 22 is provided by the sensors 4 and read by the read program 32.

Advantageously, if the predicted component is outside the flight envelope, the processing program 36 corrects the value of the predicted variation so that the corresponding predicted component is no longer outside the flight envelope.

During a following step 140, the display 16 displays all or part of the predicted short-term flight path computed by the computer 14 at the end of prediction step 105.

If, at the end of the display step 140, the user places the primary control members 3 in a predetermined neutral position during a step 145, then, during a following step 150, the enslavement device 6 controls the aircraft 1 to enslave its flight path relative to the predicted flight path computed by the computer at the end of prediction step 105. The predicted flight path then forms a guidance instruction designed to be sent to the enslavement device 6.

Advantageously, the predicted flight path is frozen, i.e., it is no longer modified, once it forms a guidance instruction.

Alternatively, the yoke 8 includes a longitudinal neutral zone and a transverse neutral zone. The longitudinal neutral zone, the transverse neutral zone, respectively, represents a predefined displacement range of the yoke 8 around its equilibrium point in a longitudinal direction, transverse direction, respectively, such as a range of 5° centered on the equilibrium point, i.e., around the position of the yoke 8 when no force is exerted on the yoke 8. If the yoke 8 is in the longitudinal neutral zone, then during the following step 150, the enslavement device 6 commands the aircraft 1 to enslave the gradient relative to the predicted gradient, computed by the computer at the end of prediction step 105. If the yoke 8 is in the transverse neutral zone, then during the following step 150, the enslavement device 6 commands the aircraft 1 to enslave the roll angle relative to the predicted roll angle, computed by the computer at the end of prediction step 105.

Alternatively, the thrust control member 10 includes a neutral zone. The neutral zone represents a predefined displacement range of the control member 10 around a predetermined position, such as a range of 5° centered on the predetermined position. If the control member 10 is in the neutral zone, then during the following step 150, the enslavement device 6 commands the aircraft 1 to enslave the longitudinal speed relative to the predicted longitudinal speed, computed by the computer at the end of prediction step 105.

Otherwise, the prediction device 5 again computes an estimate of the short-term flight path of the aircraft 1, during prediction step 105.

Alternatively, the integration sub-step 130 precedes the estimation sub-step 115. Consequently, during the estimation step 115, the processing program 36 applies the filter H to the integral relative to the time of the control signal. At the end of the estimating sub-step 115, the processing program 36 will then have computed the variation in the flight path of the aircraft 1.

Also alternatively, the integration sub-step 130 precedes the sub-step 125.

Thus, the computation, from the control signal, of an estimate of the variations over time of the time derivatives of predicted components of the flight path of the aircraft 1 provides assistance in piloting and improves the safety of the flight.

Furthermore, the computation of an estimate of the variation over time of at least one component among the roll rate, the load factor and the longitudinal acceleration of the aircraft 1 provides an even more reliable short-term prediction, the flight path in fact being computed from predicted variations and not from a constant instruction, as done in the state of the art.

Furthermore, the use of a transform of the control signal, for example a filter whereof the transfer function has a phase greater than or equal to zero in a frequency band of interest, provides, as output, a signal with a phase advance relative to the control signal. This makes it possible to anticipate the variations of the control signal and leads to a better prediction of the short-term flight path.

Furthermore, the fact that the transfer function H of the filter varies over time, in particular as a function of parameters depending on the type of aircraft 1 and/or properties measured by the sensors 4 of the aircraft 1, makes it possible to improve the prediction of the flight path by adapting the filter to the flight conditions of the aircraft 1.

As can be appreciated by one of ordinary skill in the art, each of the modules or software of the program(s) can include various sub-routines, procedures, definitional statements, and macros. Each of the modules are typically separately compiled and linked into a single executable program. Therefore, any description of modules or software is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method for predicting a short-term flight path of an aircraft, the flight path of the aircraft being associated at each point in time with a vector including at least one component from among a position of the aircraft, attitudes of the aircraft, a speed of the aircraft, and an angular speed of the aircraft, the short-term flight path being the flight path of the aircraft for a time period up to 30 seconds from a computation time of the flight path, the method including:

acquiring, by an acquisition device, a current control signal representative of a current displacement of a primary control member of the aircraft at the computation time, the acquisition device converting a command applied by a user onto the primary control member into the current control signal; and predicting, for a subsequent time, at least one predicted component of the short-term flight path of the aircraft, the prediction being carried out at the computation time, wherein the predicting further includes computing, from the current control signal, an estimate, between the computation time and the subsequent time, of at least one time derivative of the at least one predicted component, the estimated time derivative depending on the subsequent time and on the current displacement of the primary control member, and wherein the predicting further includes computing the value of the at least one predicted short-term flight path component of the aircraft from the computed estimate of the at least one time derivative of the at least one predicted component.

2. The method of claim 1, wherein the predicting further includes computing an estimate of the variation, between the computation time and the subsequent time, of at least one component among the roll angle, the longitudinal speed and the vertical speed of the aircraft, and/or at least one additional property relative to the aircraft.

3. The method of claim 2, wherein the additional property is a turning radius, an airspeed, or a gradient of the aircraft.

4. The method of claim 1, wherein the predicting comprises converting a first signal depending on the current control signal into a second signal representative of an estimate of the value of the first signal at at least one time after the computation time, from the value of the first signal at at least one time prior or equal to the computation time.

5. The method of claim 4, wherein the converting of the signal depending on the current control signal comprises applying a filter to the signal, the filter having a transfer function, the phase of which is greater than or equal to zero in a predetermined frequency band.

6. The method of claim 5, wherein the transfer function of the filter varies as a function of time.

7. The method of claim 6, wherein the transfer function varies based on the type of aircraft or time-dependent properties measured by at least one sensor of the aircraft.

8. The method of claim 1, wherein the predicting further includes modifying the estimate of the variation of the at least one predicted component of the short-term flight path of the aircraft or at least one additional property, based on at least one estimate of the variation of another component of the short-term flight path of the aircraft or another additional property.

9. The method of claim 8, wherein at least one additional property is a turning radius, an airspeed, or a gradient of the aircraft.

10. A non-transitory computer-readable medium comprising a computer program including software instructions which, when implemented by a computer, implement a method for predicting a short-term flight path of an aircraft, the flight path of the aircraft being associated at each point in time with a vector including at least one component from among a position of the aircraft, attitudes of the aircraft, a speed of the aircraft, and an angular speed of the aircraft, the short-term flight path being the flight path of the aircraft for a time period up to 30 seconds from a computation time of the flight path, the method including:
  acquiring, by an acquisition device, a current control signal representative of a current displacement of a primary control member of the aircraft at the computation time, the acquisition device converting a command applied by a user of the primary control member into the current control signal; and
  predicting, for a subsequent time, at least one predicted component of the short-term flight path of the aircraft, the prediction being carried out at the computation time;
  wherein the predicting further includes computing, from the current control signal, an estimate, between the computation time and the subsequent time, of at least one time derivative of the at least one predicted component, the estimated time derivative depending on the subsequent time and on the current displacement of the primary control member, and
  wherein the predicting further includes computing the value of the at least one predicted short-term flight path component of the aircraft from the computed estimate of the at least one time derivative of the at least one predicted component.

11. An aircraft guidance method, comprising:
  predicting a short-term flight path using the method of claim 1; and
  enslaving the at least one component of the aircraft flight path relative to the at least one predicted short-term flight path component of the aircraft.

12. The method of claim 11, wherein the predicted component of the flight path is no longer modified during the enslavement and then forms an instruction designed to be sent to an enslavement device for the flight path of the aircraft.

13. The method of claim 11, wherein the primary control member is associated with the at least one component of the flight path, wherein the primary control member has a neutral zone, the neutral zone representing a predefined displacement range of the primary control member around a predetermined position of the primary control member, and wherein, when the primary control member is positioned in the neutral position in one or more directions, the component(s) of the flight path of the aircraft associated with the directions are enslaved relative to the corresponding predicted short-term flight path component of the aircraft.

14. A prediction device for predicting a short-term flight path of an aircraft, the flight path of the aircraft being associated at each point in time with a vector including at least one component from among a position of the aircraft, attitudes of the aircraft, a speed of the aircraft, and an angular speed of the aircraft, the short-term flight path being the flight path of the aircraft for a time period up to 30 seconds from a computation time of the flight path, the prediction device including:
  an acquisition device for acquiring a current control signal representative of a current command applied by a user to a control member of the aircraft at the computation time, the acquisition device converting the current command applied by the user to the control member into the current control signal; and
  at least one prediction module for predicting, at the computation time, at least one predicted component, for a subsequent time, of the short-term flight path of the aircraft,
  wherein the prediction module is further suitable for computing, from the current control signal, an estimate, between the computation time and the subsequent time, of at least one time derivative of the at least one predicted component, the estimated time derivative depending on the subsequent time, and
  wherein the prediction module is further suitable for computing the value of the at least one predicted short-term flight path component of the aircraft from the computed estimate of the at least one time derivative of the at least one predicted component.

15. An aircraft guidance system including:
  a prediction device according to claim 14, able to predict a short-term flight path of the aircraft; and
  an enslavement device able to enslave the flight path of the aircraft relative to the predicted short-term flight path.

16. An aircraft including at least one control member and a prediction device for predicting a short-term flight path of an aircraft, the flight path of the aircraft being associated at each point in time with a vector including at least one component from among a position of the aircraft, attitudes of the aircraft, a speed of the aircraft, and an angular speed of the aircraft, the short-term flight path being the flight path of the aircraft for a time period up to 30 seconds from a computation time of the flight path, the prediction device including:
  an acquisition device for acquiring a current control signal representative of a current command applied by a user to a control member of the aircraft at the computation time, the acquisition device converting the current command applied by the user to the control member into the current control signal; and
  at least one prediction module for predicting, on the computation time, at least one predicted component of the short-term flight path of the aircraft for a subsequent time, wherein the prediction module is further suitable for computing, from the current control signal, an estimate, between the computation time and the subsequent time, of at least one time derivative of the at least one predicted component, the estimated time derivative depending on the subsequent time, wherein the prediction module is further configured to computer the value of the at least one predicted short-term flight path component of the aircraft from the computed estimate of the at least one time derivative of the at least one predicted component, and wherein the prediction module is configured to predict the short-term flight path of the aircraft from the current command applied by the user to the control member.

17. The aircraft of claim 16, further including an enslavement device to enslave the short-term flight path of the aircraft relative to the predicted short-term flight path.

* * * * *